United States Patent [19]
Kouno et al.

[11] Patent Number: 5,481,372
[45] Date of Patent: Jan. 2, 1996

[54] AREA CONTROL SYSTEM FOR IMAGE PROCESSING APPARATUS

[75] Inventors: Katuyuki Kouno; Kazuman Taniuchi; Hiroshi Sekine, all of Kanagawa, Japan

[73] Assignee: Fuji Xerox Co., Ltd., Tokyo, Japan

[21] Appl. No.: 355,221

[22] Filed: Dec. 9, 1994

Related U.S. Application Data

[63] Continuation of Ser. No. 879,359, May 7, 1992, abandoned.

[30] Foreign Application Priority Data

May 14, 1991 [JP] Japan ................................. 3-107973

[51] Int. Cl.[6] ................................................. H04N 1/415
[52] U.S. Cl. ........................... 358/433; 358/453; 382/176
[58] Field of Search .................................. 358/433, 451,
358/452, 453, 468, 520, 537, 538, 462;
345/118, 121; 382/176, 233, 282; H04N 1/32,
1/415, 1/54

[56] References Cited

U.S. PATENT DOCUMENTS

| 4,922,335 | 5/1990 | Outa et al. | 358/75 |
| 4,949,279 | 8/1990 | Takakura et al. | 395/131 |
| 4,990,902 | 2/1991 | Zenda | 382/44 |
| 5,086,346 | 2/1992 | Fujisawa | 382/44 |
| 5,136,399 | 8/1992 | Aoyama | 340/703 |
| 5,136,401 | 8/1992 | Yamamoto et al. | 358/474 |
| 5,181,104 | 1/1993 | Sugishima et al. | 358/474 |
| 5,287,204 | 2/1994 | Koizumi et al. | 358/538 |
| 5,309,258 | 5/1994 | Kouno et al. | 358/537 |

FOREIGN PATENT DOCUMENTS

| 62-181570 | 8/1987 | Japan . |
| 64-1369 | 1/1989 | Japan . |
| 64-84977 | 3/1989 | Japan . |
| 2-223275 | 5/1990 | Japan . |

Primary Examiner—Scott A. Rogers
Assistant Examiner—Kim Yen Vu
Attorney, Agent, or Firm—Finnegan, Henderson, Farabow, Garrett & Dunner

[57] ABSTRACT

An area control system for an image processing apparatus including a input unit 1 for inputting image signals, a area control unit 2 for generating control signals according to a specified area, document type and processing mode, and a processing unit 3 having a plurality of processing blocks 3-1, 3-2, . . . for processing image signals by setting parameters in the processing blocks 3-1, 3-2, . . . , comprises a decode unit 4 for generating signals to switch the parameters in the processing blocks 3-1, 3-2, . . . of the processing unit 3 by control signals for each area generated by the area control unit 2. The decode unit distributes the control signals from the area control unit to the processing blocks, through the decode unit 4. With such an arrangement, when the area control unit 2 merely outputs the document type and a processing mode for each area, such as an input mode and an output mode, the decode unit 4 automatically generates control signals for the processing blocks 3-1, 3-2, . . . and distributes them to the processing blocks. If the decode unit 4 is provided for each processing block 3-1, 3-2, . . . , the processing system and the processing blocks, if required, can be altered or modified for each processing block.

10 Claims, 7 Drawing Sheets

AREA CONTROL SYSTEM FOR IMAGE PROCESSING APPARATUS

This application is a continuation of application Ser. No. 07/879,359, filed May 7, 1992, now abandoned.

BACKGROUND OF THE INVENTION

1. Field of the Invention

The present invention relates to an area control system for an image processing apparatus comprising an input unit for inputting image signals, an area control unit for generating control signals for each specified area according to its document type and processing mode, and a processing unit having a plurality of processing blocks for processing image signals by setting parameters in the respective processing blocks.

2. Description of the Prior Art

A digital copying machine is made up of an IIT (image input terminal) for reading an image on an original document, an IPS (image processing system) for processing image data, and an IOT (image output terminal) for driving a laser printer, for example, by image data to output a hard copy. In the IIT, a CCD sensor picks up image information on the original in the form of analog image signals which depend on reflectivities. Then, the analog image data signals are converted into multitone digital image data. In the IPS, the image data signals obtained by the IIT are processed for various types of corrections, conversion, edit and the like. In the IOT, according to the image data processed by the IPS, a laser device in the laser printer is turned on and off to depict and output a mesh-dot picture.

Thus, the digital copying machine can produce, by processing the multi-tone image data by the IPS according to the type of the image data, a sharp image edge-emphasized for characters, a smoothed image for a halftone image, such as photograph, and a color-adjusted color image of high reproduction performance. Further, the machine can makes various types of edit of the document image, such as painting for the original, color change, trimming, shift, composition, reduction, and enlargement. In a color digital copying machine, the IIT reads the document image after it is separated into three primary colors R (red), G (green), and B (blue), and supplies the image data of three colors to the IPS. In the IOT, mesh-dot images of toner colors Y (yellow), M (magenta), C (cyan), and K (black) are formed and superposedly composed. Accordingly, in the image processing system, such as a color digital copying machine, toner developing units are provided for the respective colors. A full-color image on an original document is read by successively scanning the document image four times in connection with the developing processes of the respective colors. The full-color image data thus read is processed.

Figure 6:
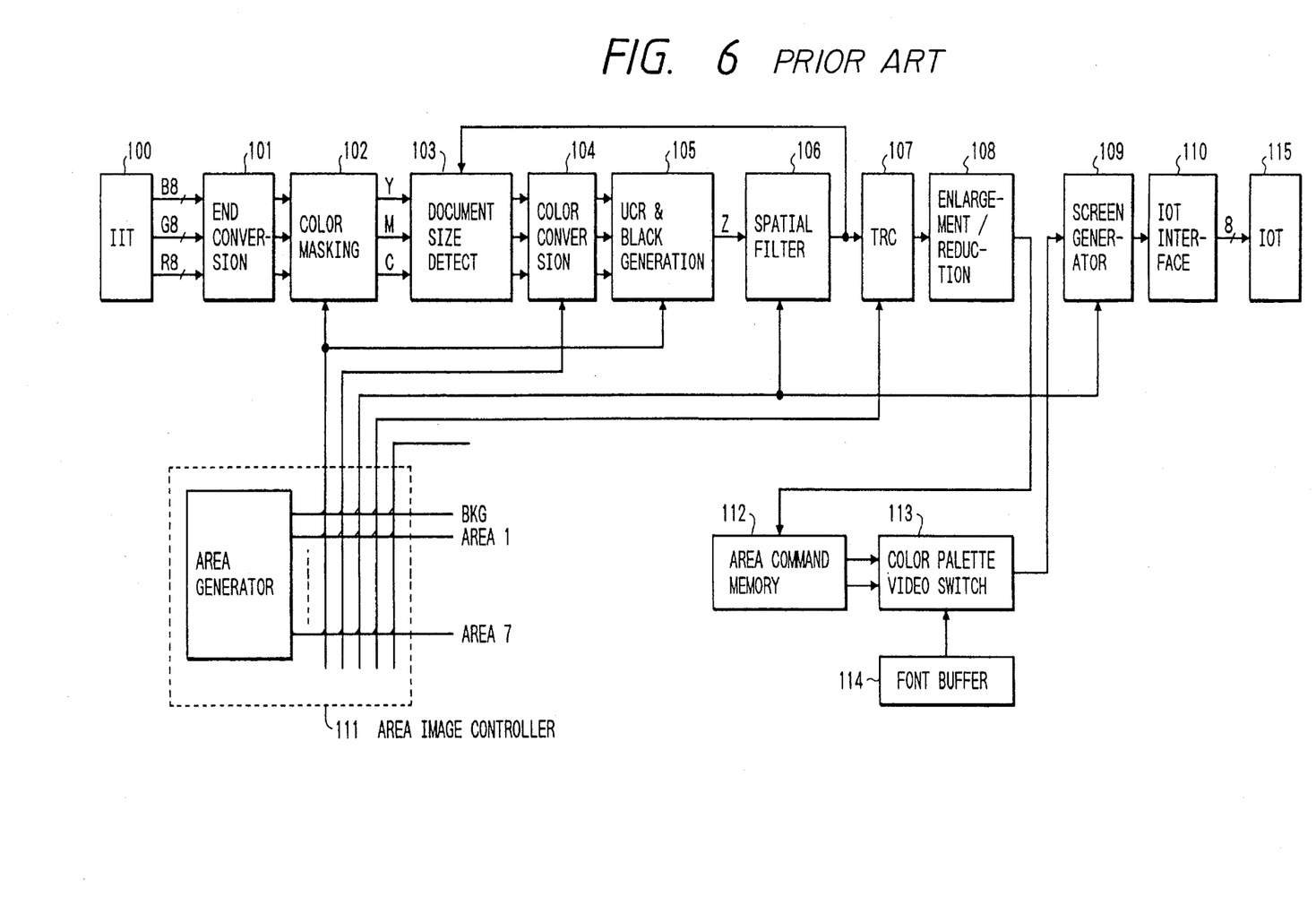
FIG. 6 is a block diagram showing the construction of a conventional color digital copying machine.

The outline of the color digital copying machine thus constructed will be described with reference to Unexamined Japanese Patent Publication Hei-2-223275. FIG. 6 is a block diagram showing the arrangement of the conventional color digital copying machine.

In FIG. 6, an IIT 100 separates a color document image into three primary colors B, G, and R, and reads the images of the three colors by using a CCD sensor so that the images are converted into digital image signals. An IOT 115 reproduces a color image through the exposure process by the laser beam and the development processes. The components ranging from an END converter 101 to an IOT interface 110, which are located between the IIT 100 and the IOT 115, make up an image data edit processing system (image processing system (IPS)). In the IPS, color image data of B, G, and R are converted into image data of toner colors Y, M, and C, and further K (Black). Every developing cycle the toner color signal of the developing color is transferred to the IOT 115.

In the IIT 100, the CCD sensor reads the document images of B, G and R with the size of 16 dots/mm for each pixel, and outputs the read image data of 24 bits (3 colors×8 bits; 256 tones). The CCD sensor of 300 mm long and 16 dots/mm in density and having B, G and R filters attached to the upper surface thereof, performs a scan of 16 lines/mm at the process speed of 190.5 mm/sec. The sensor produces the image data at the speed of approximately 15 M pixels per second for each color. The IIT 100 logarithmic-converts the analog data of B, G and R pixels, whereby transforming the reflectivity information into the density information, and converting it into digital data.

The IPS receives the color separated signals B, G and R from the IIT 100, and processes the received image data in various ways for improving the reproduction performances of color, tone, definition, and the like. The IPS converts the coloring material signals of the developing process colors into on/off signals, and transfers the converted ones to the IOT. The END (equivalent neutral density) module 101 adjusts (converts) the color image signals to gray-balanced color image signals. A color masking module 102 converts the B, G and R signals into signals corresponding to the quantities of Y, M and C coloring materials, through a matrix operation. A document-size detecting module 103 detects the document size in a prescan mode, and erases (makes a frame-erasure) the platen color in a read scan mode. A color change module 104 makes the change for a specified color in a specific area according to an area signal supplied from the area image control module. A UCR (under-color removal) & black generation module 105 generates a proper quantity of black K so as not to lose the color purity, subtracts the equal quantities of the toner colors Y, M and C therefrom according to the quantity of black K, and gates the signals after removal of the under-colors of the K, and Y, M and C colors are removed according to the signals in a mono-color mode and a 4-full-color mode. A spatial filter 106 is a nonlinear digital filter having the function to restore the image from being blurred, and the function to remove moire from the image. A TRC (tone reproduction control) module 107 makes the adjustments of density, contrast, and color balance, and makes a negative/positive inversion and other processings for reproduction improvements. A enlargement/reduction module 108 is provided for enlarging and reducing the size of an image in the horizontal scan direction. Incidentally, the size adjustment in the vertical scan direction is performed by adjusting the speed of scanning the original. A screen generator 109 converts the toner color signals expressed in multi-tone into on/off or binary-coded signals according to the tones. The binary-coded toner color signals are output to the IOT 115, through an IOT interface module 110. An area image control module 111 includes an area generating circuit and a switch matrix. An edit control module includes an area command memory 112, a color palette video switch circuit 113, a font buffer 114, and the like, and performs various types of edits.

The area-image control module 111 is arranged so as to set seven rectangular areas and the priority order of them in an area generating circuit. In connection with the respective areas, control data for the areas are set in a switch matrix. The control data includes, for example, the data of color change, color-mode of mono-color or full-color, and modulation select for photograph, character or the like, and select data for TRC and screen generator, and is used for controlling the color masking module 102, color change module 104, UCR module 105, spatial filter 106, and TRC module 107. The switch matrix may be set by a software.

With the edit control module, the painting processing may be performed in a manner that it reads a document image, such as a circle graph, not a rectangular, and paints out, with a specified color, a specified area indefinite in area. 4-bit area commands are stored in a plane memory consisting of four planes. An edit command at each point on the document is set with 4 bits of the 4-plane memory.

Other image processing systems of the type in which an area is specified and edited in an image have been proposed in, for example, Unexamined Japanese Patent Publications Sho-62-181570, Sho-64-1369, and Sho-64-84977.

In the conventional color copying machine, when it performs the area edit and area processing, a control signal is generated for each area in each of various types of modes, such as the document type and the color mode, and applied to each processing block, such as the color masking module 102 and the color change module 104. The control signals used in the area-image control module 111 are, for example, MONO (mono-color), FULL (full color), $SHARP_0$, $SHARP_1$, ZERO, $TRCSel_0$, $TRCSel_1$, $TRCSel_2$, SCRNUL and NENEDF. Under the circumstances, in such a case that the processing system or the processing block is changed and the number of control signals is increased, the area-image control module 111 as a control signal source is complicated in construction.

SUMMARY OF THE INVENTION

The present invention has been made in view of the above circumstances and has an object to generate and change control signals to switch various parameters without changing an area control signal source. Another object of the present invention is to generate control signals for the respective processing blocks according to the document type and the processing mode for each area, such as an input mode and an output mode.

To achieve the above objects, there is provided an area control system for an image processing apparatus comprising an input unit for inputting image signals, an area control unit for generating control signals according to a specified area, document type and processing mode, a processing unit having a plurality of processing blocks for processing image signals by setting parameters in the processing blocks, and a decode unit for generating signals to switch the parameters in the processing blocks of the processing unit by control signals for each area generated by the area control unit, the decode unit distributing the control signals from the area control unit to the processing blocks, through the decode unit.

The decode unit is provided for each processing block of the processing unit or includes a timing adjusting unit for adjusting timings with respect to image signals, and the decode unit generates signals to switch the parameters in the processing blocks according to the document type and the processing mode. The processing unit includes transforming unit for transforming image signals into image signals in a uniform color space, and area identifying unit for identifying an area of the document type for each processing block by the uniform color spatial signals, and the decode unit generates signals for switching the parameters of the processing blocks of the processing unit by using the control signals and the area identifying signal.

In the area control system for an image processing apparatus of the present invention, the decode unit generates signals to switch the parameters in the processing blocks of the processing unit by the area control signals that are generated by the area control unit. The control signals of the area control unit are distributed to the processing blocks through the decode unit. When the area control unit merely generates the document type and the processing mode for each area, such as the color mode, the decode unit automatically generates the control signals for the processing blocks and distributes them to the processing blocks. If the decode unit is provided for each! processing block, the processing system and the processing blocks, if required, can be altered or modified for each processing block.

DETAILED DESCRIPTION OF PREFERRED EMBODIMENTS

Figure 1:
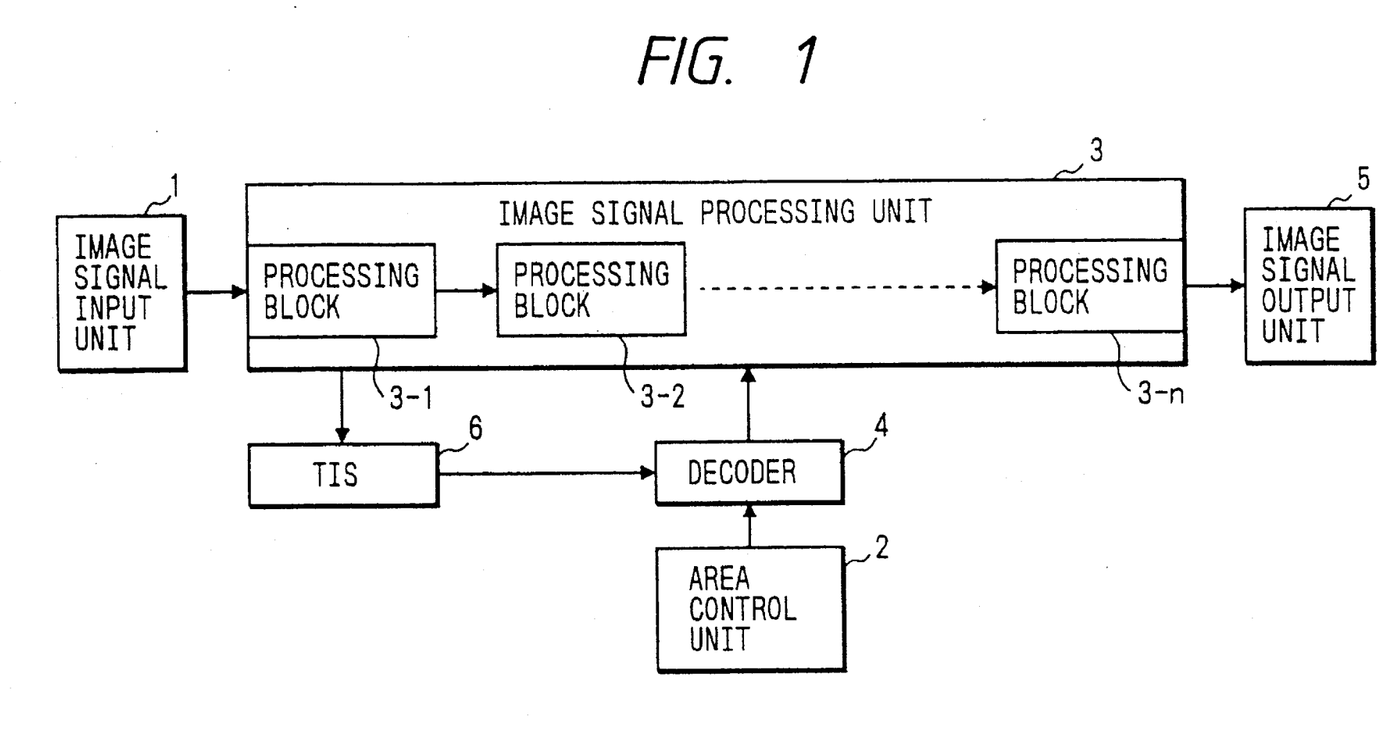
FIG. 1 is a block diagram showing an area control system for an image processing apparatus, which is an embodiment of the present invention.

Preferred embodiments of the present invention will be described with reference to the accompanying drawings. FIG. 1 is a block diagram showing an area control system for an image processing apparatus, which is an embodiment of the present invention.

In FIG. 1, an image signal input unit 1 includes an IIT for picking up, by using a CCD sensor, image information of an image on an original document in the form of analog electric signals which depend on reflectivities, and converts the analog image data signals into multi-tone digital image data signals, a computer and/or a device for entering image signals. An area control unit 2 generates control signals according to an area specified by an edit pad or a control panel, the document type, or a color mode. An image signal processing unit 3, which includes a plurality of processing blocks 3-1, 3-2, . . . , sets parameters in these processing blocks, and processes the image signals. The processing blocks 3-1, 3-2, . . . are for gray balance adjustment and the processings of UCR, TRC, and the like. A decoder 4 generates signals for switching parameters in the processing blocks 3-1, 3-2, . . . of the image signal processing unit 3 by using an each-area control signal generated by a TIS (area identifying) circuit 6, and an area identifying signal, and distributes those generated signals to the related circuits. The TIS circuit 6 identifies, for each block, an area of the document type, such as character/half tone by using signals in the uniform color space, for example. An image signal output unit 5 reproduces a color image through the exposure process by a laser beam and the developing process.

As described above, the decoder 4 generates signals for switching the parameters of the UCR, filter, TRC, multiplier, and the like according to the data to be processed of photograph, character, full color, or monocolor. Accordingly, without regard to the type of the control signal, the area control unit 2 may generate area control signals for the document type and color mode, and send them to the decoder 4.

Figure 2A:
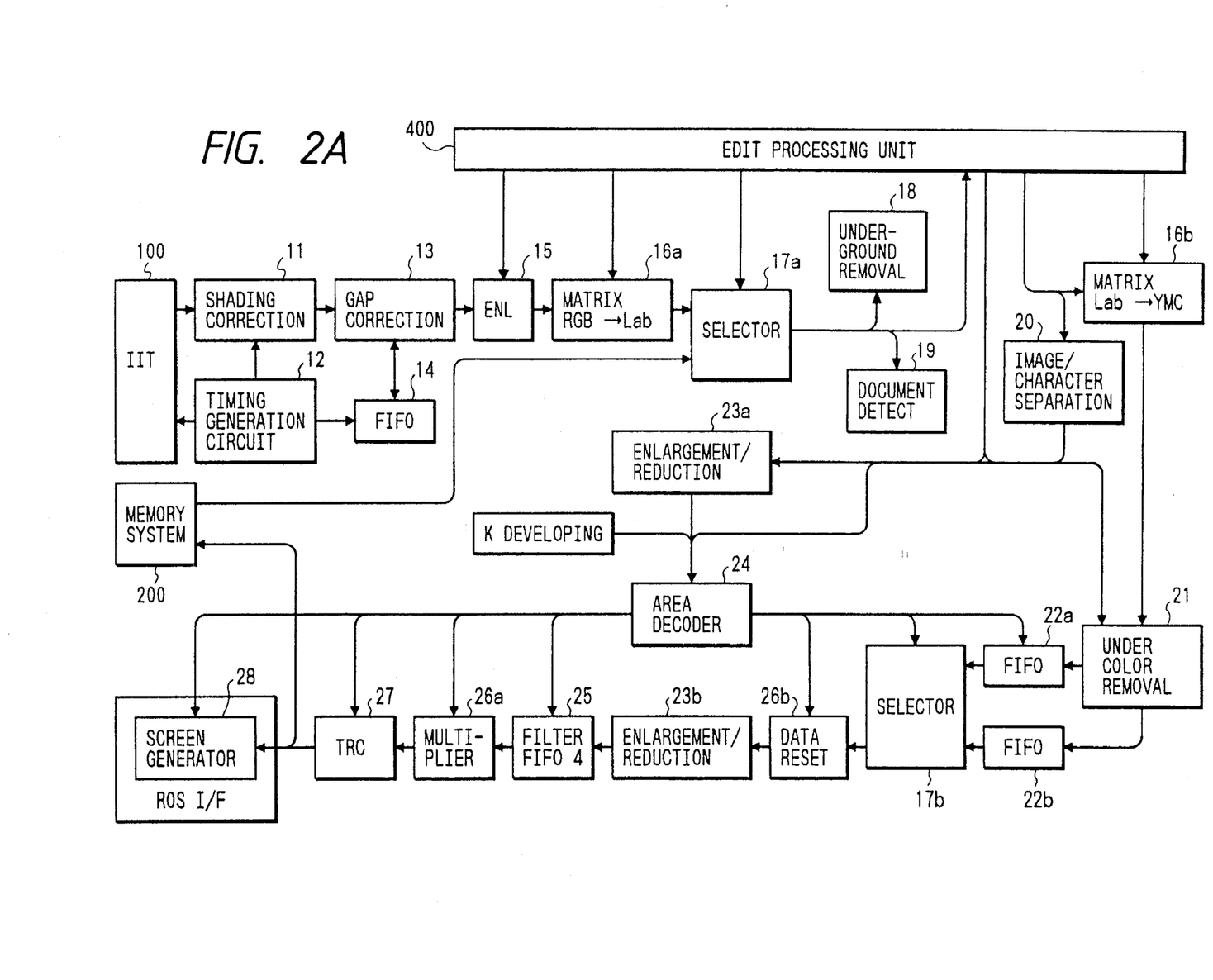
FIG. 2 shows block diagrams showing an arrangement of a signal processing system in the image processing apparatus.
Figure 2B:
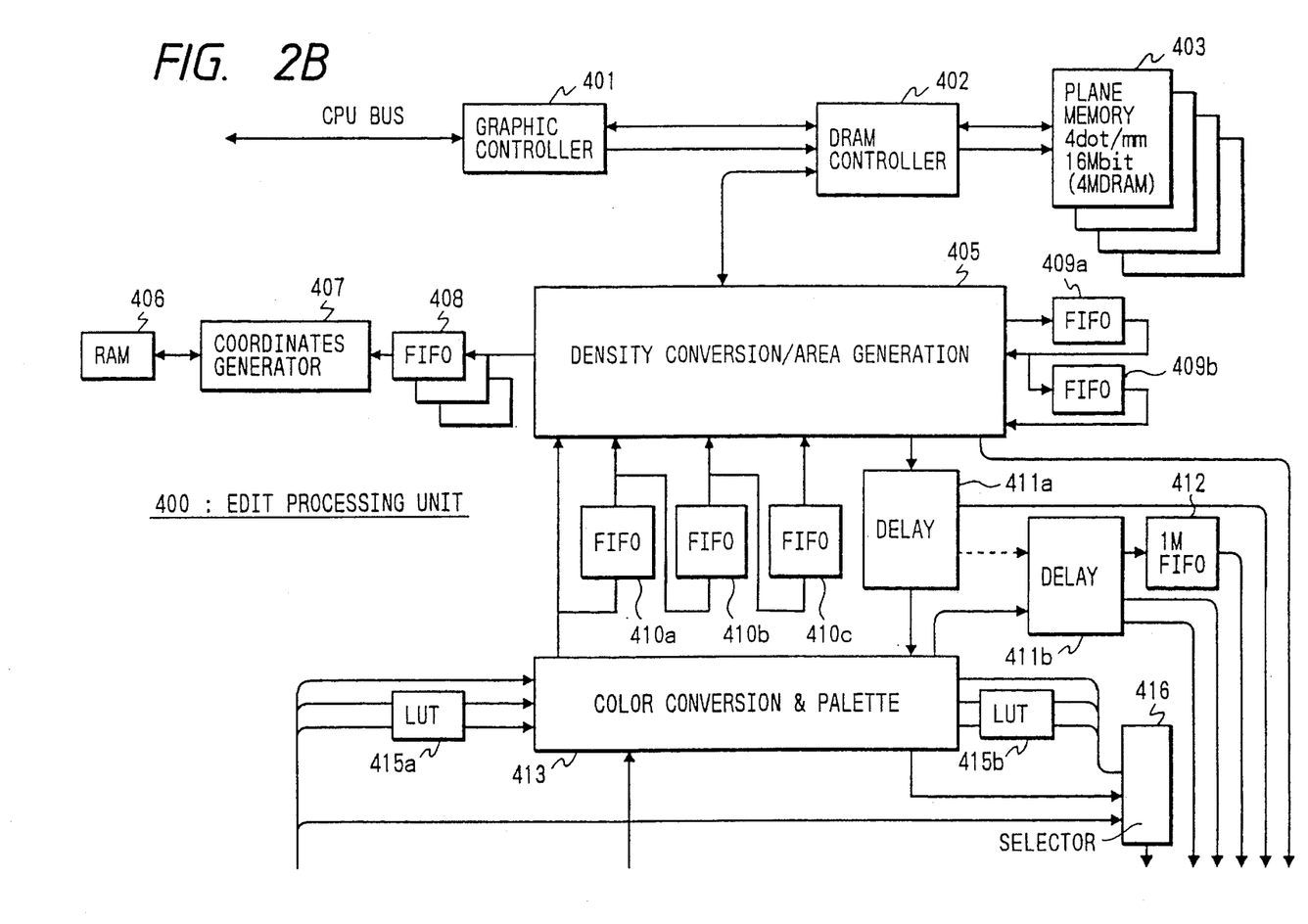
Figure 3:
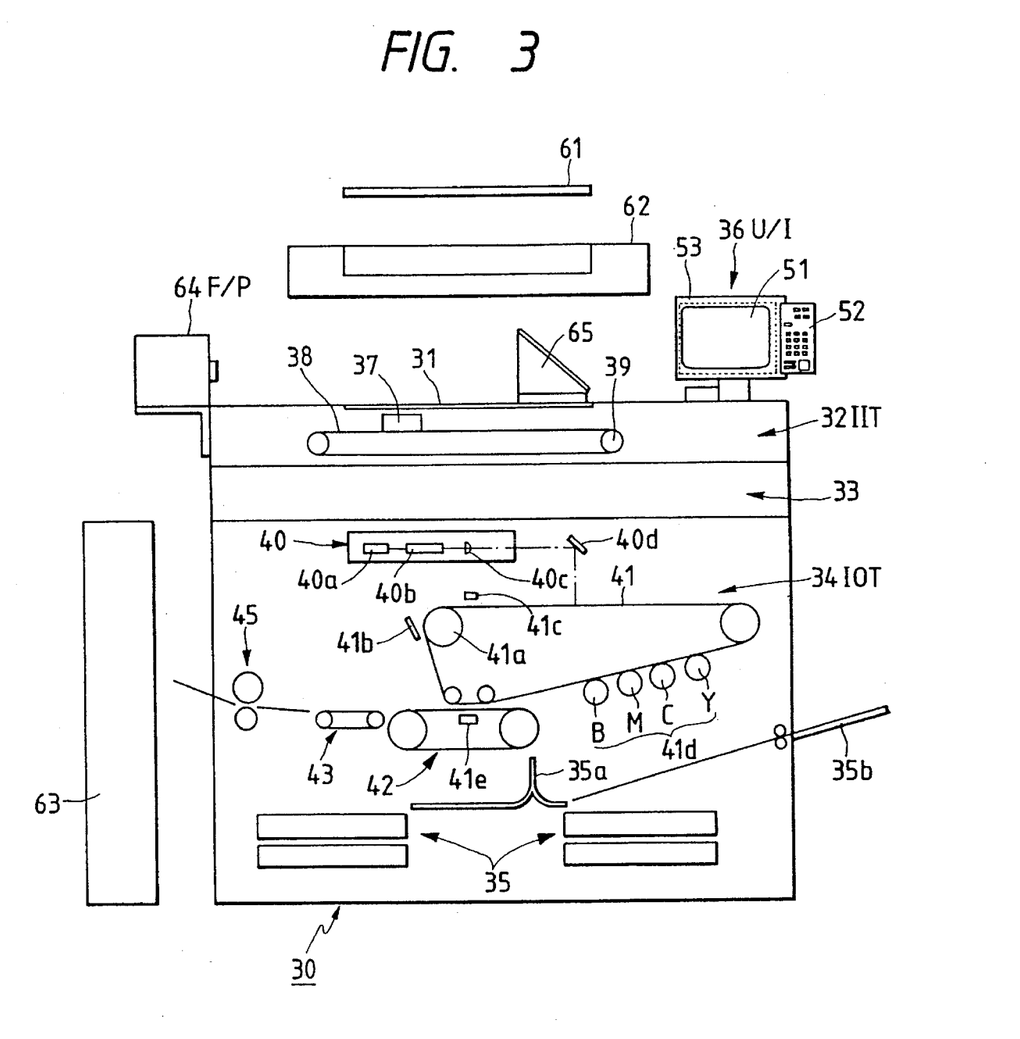
FIG. 3 is a diagrammatic view showing the mechanical construction of the image processing apparatus.
Figure 4:
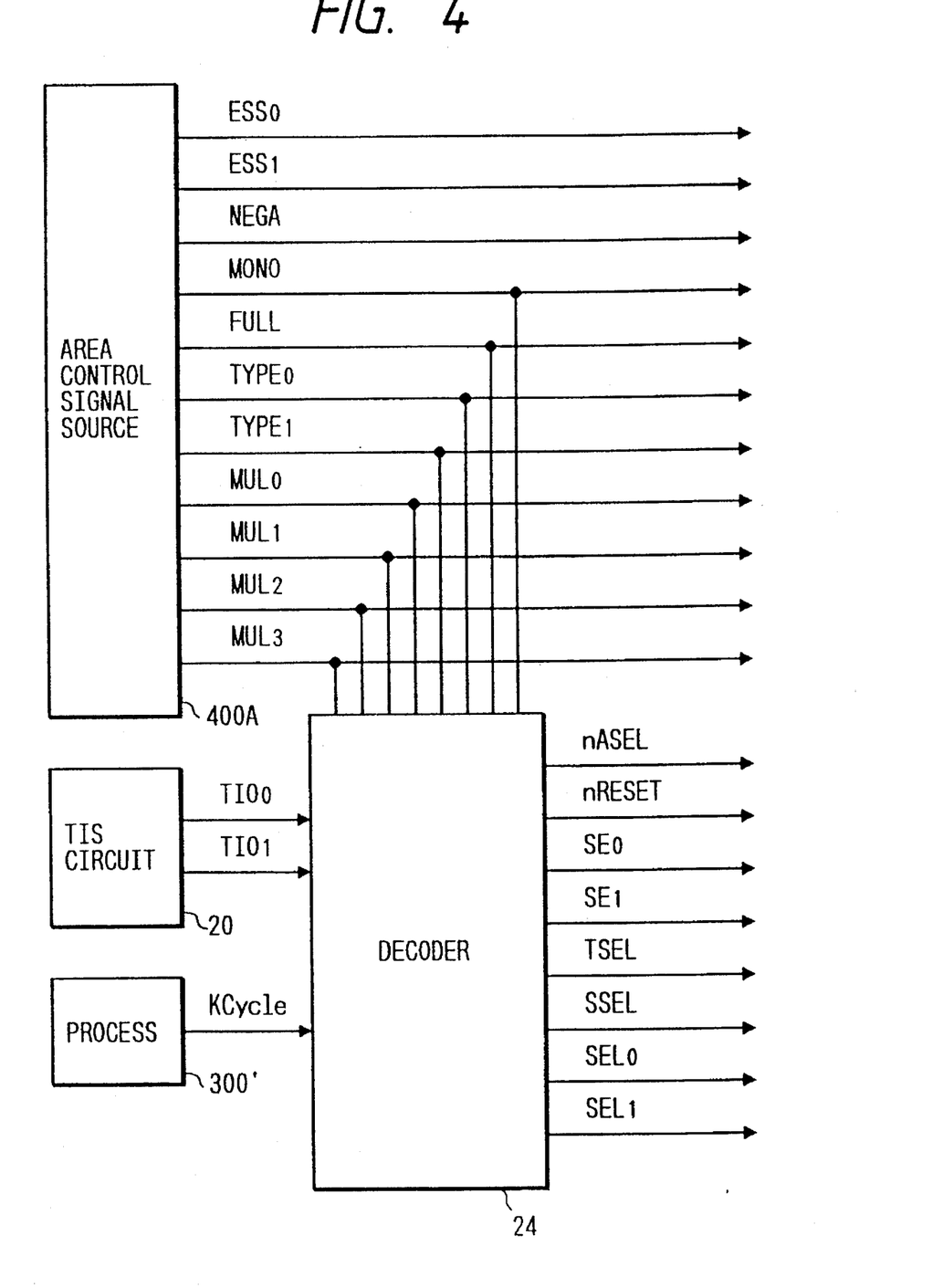
FIG. 4 is a diagrammatic view showing the partial arrangement of the image processing apparatus, the illustration well showing area control signals.

An arrangement of an image processing apparatus incorporating the present invention will be described. FIG. 2 is a block diagram showing an arrangement of a signal processing system in the image processing apparatus. FIG. 3 is a diagrammatic view showing the mechanical construction of the image processing apparatus. FIG. 4 is a diagrammatic view showing the partial arrangement of the image processing apparatus, the illustration well showing area control signals.

In FIG. 2, an image input terminal (IIT) 100 contains a size-reduction type sensor which consists of three line sensors of R, G and B arranged perpendicular to the vertical scan direction. The IIT 100 scans in the horizontal scan direction in synchronism with a timing signal from a timing generating circuit 12, while moving in the vertical scan direction at the speed based on the magnification of enlargement and reduction. In the IIT, the analog image data is converted into digital image data of 8 bits, for example, which is expressed in gray levels. The image data suffering from the nonuniformity among the pixels owing to various factors is shading-corrected by a shading correction circuit 11, and applied to a gap correction circuit 13 where gaps among the line sensors are corrected. In the gap correction, the read image data is delayed by the quantities corresponding to the gaps by an FIFO 14 so that the R, G, and B image signals corresponding to the same position appear at the same time. An ENL (equivalent neutral lightness) converting circuit 15 is provided for gray balancing the image data using the parameters based on the document type. The setting of gray levels in the image signal is inverted every pixel, viz., the negative/positive inversion is performed, by a negative/positive inverting signal from an edit processing unit 400 to be given later. The ENL converting circuit 15 may selectively make the negative/positive inversion in only a specific image area.

The R, G and B image signals processed by the ENL converting circuit 15 are converted into image signals L*, a*, and b* in a uniform color space by a matrix circuit 16a. Of these signals L*, a*, and b*, the signal L* indicates a lightness and the signals a*, and b* indicate a chromaticity plane (hue and chroma) in the coordinates system having three coordinate axes. With the conversion of the image signal from R, G and B to L*, a*, and b*, an easy interface of the system with other devices, such as computers through a memory system 200 is realized and the color change, edit processing and image data detection are easy. A selector 17a selects either the output signal of the matrix circuit 16a or the image data from the memory system 200 as an interface with an external computer, or receives both image data to make the texture composition or the superposing composition. To this end, the selector 17a has the function of setting the composition ratio, and the functions of the calculating processing, and the composition processing.

An underground removal circuit 18 detects an underground density by preparing a histogram of densities on the document through a prescan, and removes the pixels having densities lower than the detected underground density, thereby to improve the copy quality of fog-contained documents like news paper. A document detector 19 detects and stores the size of an original document. To detect the document size, the detector 19 detects the boundary of the reverse side of a platen cover and the original document, thereby to obtain a rectangular defining the outer peripheral edge of the original. In the under ground removal circuit 18 and the document detector 19, the lightness signal L* of those uniform color space signals L*, a*, and b* is used.

In the edit processor 400 performs the edit processing for each area, sets area commands for switching the parameters, and generates area control signals based on the area commands. Further, it performs the processings of the color edit and color change for the image data, the processing of marker color detection, and the like. The image data thus processed is input to a matrix conversion circuit 16b and an image/character separation circuit (TIS circuit) 20.

The L*, a*, and b* image data signals after edit processed are transformed into the toner colors Y, M and C, by the matrix conversion circuit 16b. The image/character separation circuit 20 groups a plurality of pixels into blocks to identify the area of color character, black character or image (character/halftone). The under-color removal circuit 21 generates black (K) using the image data of Y, M and C output from the matrix conversion circuit 16b according to the signal of mono-color/full-color, and subtracts the equal quantities of the Y, M and C image data from the Y, M and C image data to produce the image data of process colors. In this case, as described above, the under-color removal circuit 21 performs the normal under-color removal as stated above and the 100% under-color removal performed by using the minimum values of Y, M and C, and applies the results to FIFOs 22a and 22b, respectively. Since in identifying the area by the image/character separation circuit 20, the pixels are grouped into blocks, the area identifying signal is delayed by 12 lines, for example. The FIFOs 22a and 22b are used for synchronizing the image data with the delayed area identifying signal. A selector 17b selects the image data according to the result of the area identification by the image/character separation circuit 20. Specifically, when the character area is identified, the 100% under-color removed image data is selected by the selector. When the image area (halftone) is identified, the image data that has been subjected to the normal under-color removal processing is selected by the selector. When the image data in the character area indicates the black character, a data reset circuit 26b resets the image data of Y, M and C, that is, except K, viz., sets the image data to 0. When content of the image data is not the character, the data reset circuit 26b allows the image data to pass therethrough as intact. When the image data represents the color character, the data reset circuit resets only the data K, thereby to improve the chroma of the color character.

An enlargement/reduction circuit 23b enlarges or reduces the size of the image data according to a specified enlargement or reduction rate. The enlargement or reduction of the image data in the vertical scan direction is performed in the IIT (image input terminal) 100, by changing the scanning speed according to the rate of enlargement or reduction. Accordingly, the enlargement/reduction circuit thins out or interpolates the image data in the horizontal scan direction. Another enlargement/reduction circuit 23a is provided for processing area commands for enlargement or reduction so that area control data is applied exactly to the area to which it is to be applied. The area control data after the enlargement or reduction processed is decoded by an area decoder 24, and applied to the decoded data to the respective processing blocks. The area decoder 24 generates, by using the area commands and area identifying signals, signals for switching the parameters of a filter 25 and a TRC circuit 27, the efficient of a multiplier 26a, and the like, and distributes the generated signals to the related circuits.

The filter 25 processes the enlarged or reduced image data to remove moire in the halftone image and emphasis edges in the character image according to a spatial frequency. The TRC circuit 27 is used for adjusting the density according to the IOT characteristic by using the conversion table. A multiplier 26a calculates the expression of "ax+b" where x is image data, and a and b are coefficients. The coefficients are switched to "through" for the halftone, and "high γ" for the characters. This is used in combination with the TRC circuit 27, and adjusts the colors and density of color and black characters, and image patterns by properly selectively using the coefficients for the respective colors and conversion tables. If the parameters of the filter 25 are standardized, it is possible to make the edge emphasis of the characters by using the coefficients a and b. The image data adjusted by those is stored in the memory system or output from a screen generator 28 of a ROS 300 in the form of a dot-mesh image.

The edit processor 400 performs the color change and color edit, and generates area control signals, and receives the image data L*, a*, and b* from the selector 17a. In an LUT 415a, the chromaticity data is transformed from the data a and b in the orthogonal coordinates system to the data C and H in the polar coordinates system. This is done for providing easy detection of marker and other colors, and rendering easy the color edit, color change and the like. A color change & palette 413 contains colors for color change and color edit in 32 number of palettes, and processes the image data L, C and H for marker color detection, color edit, color change and the like according to area commands supplied through a delay circuit 411a. Only the image data in the area to be color changed is processed by the color change & palette 413, and inversely transformed from the data C and H to the data a and b by an LUT 415b. The image data in the other areas than the color-changed area are directly output from a selector 416 and is transferred to the matrix conversion circuit 16b.

The marker colors (three colors) detected from the image data in the color change & palette 413 and the 4-bit signal in the closed area are transferred to a density-conversion/area generating circuit 405. In the density conversion/area generating circuit 405, by using FIFOs 410a, 410b and 410c, with a 4×4 window, the image data is binarized in such a manner that if black pixels more than a predetermined number are contained in the sixteen (16) pixels, "1" is assigned to the image data. Through the binarizing processing, the image density is converted from 400 spi to 100 spi. Marker signals (of closed loop and marker dots) thus generated in the density conversion/area generating circuit 405 are stored into a plane memory 403, through a DRAM controller 402.

Not to mistake dusty particles as the marker, the marker dot signal is delayed by the quantity of three (3) lines by means of a FIFO 408, thereby to form a 3×3 window. In a coordinates generating circuit 407, the marker dots are detected and their coordinate values are generated and stored in a RAM 406. It is to prevent the mistaken detection that the marker dot signals, which are also stored into the plane memory 403, are thus processed.

The plane memory 403 is provided for storing area commands for color change, color edit, and other area edits. Also from the edit pad, the use may specify an area and write the area command into the specified area. The area command of the area specified from the edit pad is transferred through a CPU bus to a graphic controller 401, and then is written into the plane memory 403 through a DRAM controller 402. The plane memory 403 consists of four memory planes and is capable of storing sixteen (16) types of area commands, 0 to 15.

The area commands of 4 bits stored in the plane memory 403 are read out of the memory in synchronism with the outputting operation of the image data. The area command thus read out is used for edit-processing in the color change & palette, and for switching the parameters in the filter 25, multiplier 26, TRC circuit 27, screen generator 28, and the like, through the image data processing system, ENL conversion circuit 15, matrix conversion circuit 16, selector 17, under-color removal circuit 21, and the area decoder 24. When the area command is read out of the plane memory 403, and is used for the edit processing in the color change & palette 413 and for switching the parameters in the image processing apparatus, it is required to convert the density from 100 spi to 400 spi. The density conversion is executed by the density conversion/area generating circuit 405. In the circuit 405, pixels are grouped into 3×3 blocks by using FIFOs 409a and 409b, and the data is interpolated according to the pixel block pattern. In this way, the density conversion from 100 spi to 400 spi is performed so as not to be zig-zag closed loop curves and the boundaries of edit areas. Delay circuits 411a and 411b, 1MFIFO 412, and the like are provided for the timing adjustment of the area command to the image data.

In the color copying machine shown in FIG. 3, a base machine 30 is made up of a platen glass 31 on which an original document is placed, an image input terminal (IIT) 32, an electric-control-board container 33, an image output terminal (IOT) 34, a paper tray 35, and a user interface (U/I) 36. The color copying machine is optionally provided with an edit pad 61, an automatic document feeder (ADF) 62, a sorter 63, and a film image reader having a filter projector (F/P) 64 and a mirror unit (M/U) 65.

The IIT 32 includes an imaging unit 37, a wire 38 for driving the imaging unit 37, drive pulleys 39, and the like. In the IIT 32, a color image on a color original document is separated into three primary colors B (blue), G (green), and R (red) by means of filters within the imaging unit 37, and is read by a CCD line sensor. The image data thus obtained is converted into multi-tone digital image signals B, G and R, and output to an image processing apparatus. The image processing system, contained in the electric-control-board container 33, receives B, G and R image signals, applies various types of conversions and correction processings to those image signals to improve image quality, such as colors, tone and definition, and reproduction performances, and performs additionally edit processings of the color image data. Further, the image processing system converts the image colors into the toner primary colors Y (yellow), M (magenta), C (cyan), and K (black), converts tone toner signals of the process colors into on/off or binary-coded signals, and outputs those converted signals to the image output terminal 34. In the IOT 34 including a scanner 40, and a photoreceptor belt 41, the image signals are converted into optical image signals by a laser output unit 40a. The optical image signals are imaged, in the form of a latent electrostatic image corresponding to the original color image, on the photoreceptor belt 41 through the combination of a polygonal mirror 40b, an F/θ lens 40c, and a reflection mirror 40d. The thus formed color image is transferred onto a paper supplied from the paper tray 35, and is output in the form of a color copy.

In the IOT 34, the photoreceptor belt 41, driven by a drive pulley 41a, is provided. A cleaner 41b, a charger 41c, Y, M, C and K developing units 41d, and a transfer unit 41e are disposed around the photoreceptor belt 41. A transfer device 42 is further provided in connection with the transfer unit 41e. The transfer device 42 nips a recording paper supplied through a paper transfer path 35a from the paper tray 35, is rotated four times (in the case of 4-color full copy) to transfer Y, M, C and K latent images on the paper. The paper bearing the four latent images is forwarded through a vacuum transfer unit 43 to a fusing unit 45. After the latent images are fused and fixed on the recording paper, the paper is discharged outside. An SSI (single sheet inserter) 35b allows a user to manually and selectively supply a recording paper into the paper transfer path 35a.

The U/I (user interface) 36 allows the user to select desired functions and to instruct the conditions to execute the functions. The U/I 36 is provided with a color display 51 and a control panel 52. Additional use of an infrared touch board 53 enables the user to directly enter instructions with touch buttons on the screen.

The electric-control-board container 33 contains a plurality of control boards for the IIT 32, IOT 34, U/I 36, image processing system, film projector 64, and the like, an MCB board (machine control board) for controlling the operations of the IOT 34, ADF 62, sorter 63, and the like, and an SYS board for controlling all those units.

Exemplary area commands used in the system of FIG. 2 will be best seen from FIG. 4. In FIG. 4, an area control signal source 400A corresponds to the edit processor 400 shown in FIG. 2, and generates the following commands for each area. Area commands $ESS_0$ and $ESS_1$ are used for controlling the input of the image data. An area command NEGA is for controlling the negative/positive inversion. Area commands MONO and FULL are for controlling color modes. Area commands $TYPE_0$ and $TYPE_1$ are for the control corresponding to the document type. Area commands $MUL_0$ to $MUL_3$ are for controlling the output colors (e.g., 16 colors) of monocolor.

The area commands $ESS_0$ and $ESS_1$ are applied to the selector 17a (FIG. 2A), and controls its selection of the image data to be processed, the image data from the memory system 200 as an interface with an external computer, the image data supplied from the IIT 100, or both the image data for the composition processing, such as the texture composition or spaced composition. The command NEGA is applied to the ENL circuit 15, causing it to switch the parameter for negative/positive inversion. The command MONO is input to the matrix conversion circuit 16b and the under-color removal circuit 21, and controls the circuits so as to switch, in the monocolor mode, the parameter to convert the lightness signal L* supplied from the matrix conversion circuit 16b into Y, M, and C signals, and so as to output the Y, M, and C signals as the process color signals straightforwardly, without the under-color removal process. The area command FULL is for the normal under-color removal. The commands $TYPE_0$ and $TYPE_1$ are applied to the ENL circuit 15 and the matrix conversion circuit 16a to switch the parameters thereof according to photograph, characters, dot-mesh printing, the coexistence of those, and the like.

The area decoder 24 receives the area commands other than those $ESS_0$, $ESS_1$, and NEGA that are generated by the area control signal source 400A, and area identifying signals $TIO_0$ and $TIO_1$ of the image/character separation circuit 20, and a process color signal KCycle of black K, and generates signals nASEL, nREST, $SE_0$, $SE_1$, TSEL, SSEL, $SEL_0$, and $SEL_1$. A conventional area control signal source generates additionally control signals (11+8) for those signals.

When the document mode is a standard mode or a character/full color mode, the signal nASEL is used for selecting the character image data or the normal image data depending on the identification result by the image/character separation circuit. The circuit arrangement used here is made up of the 100% UCR and normal UCR circuits, and a selector for selecting either of the output signals thereof. The signal nASEL is used for controlling the selector 17b.

When the document mode is a standard mode or a character mode/full color mode, and when the identification result by the image/character separation circuit indicates the black character, the signal nRESET resets the image data (sets it to "0") during the developing operation of other color signals than the black signal, and when the identification result indicates the color character, the signal nRESET resets the image data during the developing operation of the black signal. That is, the signal nRESET is used for control the data reset circuit 26b. In the standard mode, the signals $SE_0$ and $SE_1$ are used for selecting the filter coefficient for character or photograph depending on the identification result by the image/character separation circuit. The TSEL is a signal for replacing the tables of two types of TRC circuits 27 of the 200-line/400-line linear, and black and white of monochrome. The signal SSEL is used for changing the screens of the TRC circuit 27 and the analog screen generator 28 according to the document mode (when it is the standard mode, the identification result by the image/character separation circuit is further considered). The signals $SEL_0$ and $SEL_1$ are used for selecting the coefficients of multiplication and addition, "a" and "b" for making the linear/high γ conversion in the table of the TRC circuit 27 of 200-line/400-line, and more exactly it controls the multiplier 26.

When employing the construction as stated above, the number of control signals can be reduced from 19 to 11 in the area control signal source. In the construction, the basic signals such as the document type and the processing mode are generated, and the control signals are generated for each processing block by using the basis signals and the identifying signals by the image/character separation. With this feature of the invention, in a case where a processing block or blocks must be changed or modified, it can be readily realized.

FIG. 5 shows block diagrams of another embodiment of an area control system for an image processing system of the invention.

Figure 5A:
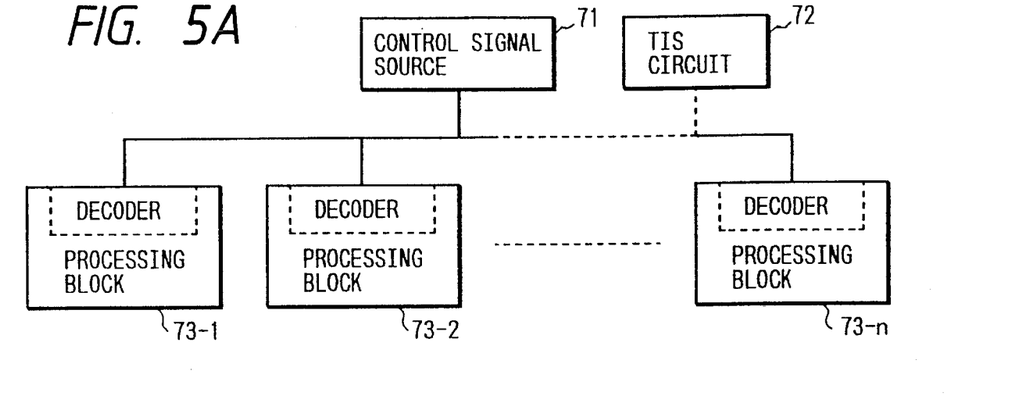
FIG. 5 shows block diagrams of other embodiments of an area control system for an image processing apparatus of the invention.

The area control system shown in FIG. 5A is arranged such that processing blocks 73-1, 73-2, . . . are respectively provided with decoders, and control signals prepared for each processing block are directly input from a control signal source 71 to the decoders. Since the area control system is thus earranged, the area identifying signals of the TIS circuit 72 can used in real time, and the system may handle every processing block. Accordingly, one can readily alter or modify the processing system and the processing blocks, if required. Further, the construction of the control signal source 71 is simplified and the confirmation of a status of each mode is easy.

Figure 5B:
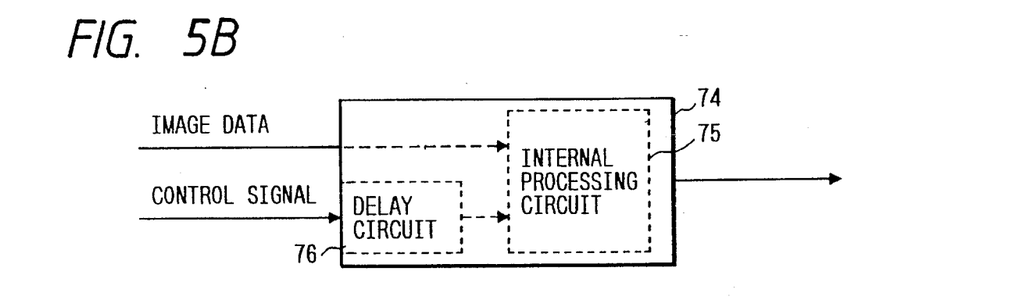

The area control system shown in FIG. 5B is arranged such that a delay circuit 76, which is provided in each processing block 74, adjusts the timings of the image data directly input to an internal processing circuit 75. As seen also from the construction of FIG. 2, the delay quantities of the control signals to the processing blocks are different with the locations of the processing blocks. To solve this, it is necessary to control the delay quantities by providing the delay circuits (LSI), and the quantities must be considered in the design stage. If the arrangement that the processing blocks respectively include delay circuits for the timing adjustment is used, other LSIs for the delay adjustment may be used leaving a margin. Since the delay quantities can be adjusted by the register, the circuit arrangement may readily be altered or modified and the design on the timing adjustment is easy.

Figure 5C:
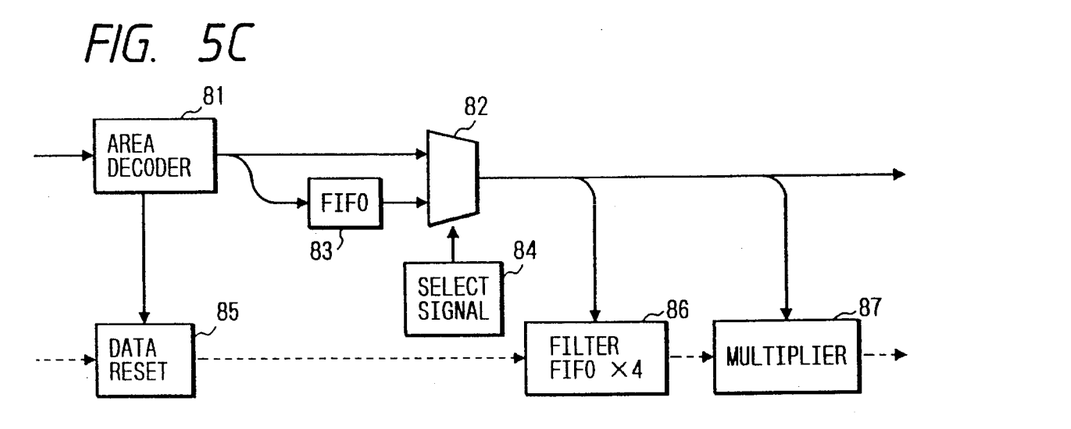

In the embodiment shown in FIG. 5C, an external FIFO 83 is coupled with an area decoder 81. The control signal output from the area decoder 81 is straightforwardly output through a selector 82, or after timing-adjusted by the FIFO 83, the control signal is output. The selection is made by the selector 82 under control of a select signal 84. Thus, this embodiment is arranged such that in connection with the delay of more than one line of the area identifying signal, the delay in the vertical scan is set by using the external FIFO 83, not the component in the area decoder 81.

It is evident that the present invention is not limited to the embodiments as mentioned above. For example, the delay setting, which is made within the area decoder, by the external FIFO or within each processing block, may be realized by any of the combinations of those.

As seen from the foregoing description, in the present invention, the control signals for switching the parameters in the processing blocks are decoded according to the document type and various modes such as the color mode, and depending on the area (block) identification results. Accordingly, the construction of the signal source of the control signals for various types of modes is simplified, and a status of each mode can be readily confirmed. The versatility of the signal source and the processing blocks is enhanced in use. Further, it is easy to additionally use the results of the area identification by the image/character separation, for the control signals.

What is claimed is:

1. In an image processing apparatus having input means for inputting image signals, an area control system for generating, for each of one or more specified areas, parameter control signals according to a document type and a processing mode of said each specified area, and processing means with a plurality of processing blocks for processing image signals according to parameters in the processing blocks, said parameters in said processing blocks being set by said parameter control signals, said area control system comprising:

area control signal generation means for generating area control signals each indicative of the document type and the processing mode of a respective said each specified area, said area control signals being supplied to said processing blocks as first parameter control signals to switch first parameters in said processing blocks; and decode means for generating second parameter control signals to switch second parameters in said processing blocks of said processing means in response to said area control signals for said each specified area and providing said second parameter control signals to said processing blocks.

2. The image processing apparatus as claimed in claim 1, wherein said decode means includes a plurality of decode units respectively provided for said plurality of processing blocks of said processing means.

3. The image processing apparatus as claimed in claim 1, further including timing adjusting means for adjusting timings of said area control signals with respect to the inputting image signals.

4. The image processing apparatus as claimed in claim 1, wherein said area control system includes timing adjusting means for adjusting timings between said image signals and/or timings of said area control signals with respect to said image signals.

5. The image processing apparatus as claimed in claim 1, wherein said processing means incudes means for transforming image signals into image signals in a uniform color space, and area identifying means for identifying an image type for each image block based on the image signals in the uniform color space and generating an area identifying signal, and said decode means comprises means for generating the second parameter control signals in response to the area identifying signal and the area control signals.

6. An image processing apparatus comprising:

input means for inputting image signals;

processing means with a plurality of processing blocks for processing image signals according to parameters in the processing blocks;

area control signal generation means for generating area control signals indicative of a document type and a processing mode of respective specified areas, said area control signals being supplied to said processing blocks as first parameter control signals to switch first parameters that are specified by an edit pad, a control panel, the document type, or a color processing mode in said processing blocks; and decode means for generating second parameter control signals to switch second parameters, the second parameters belonging to a data type to be processed, the data type including any of image types including photograph, character, full color or monocolor, in said plurality of processing blocks of said processing means in response to said area control signals for said specified areas and providing said second parameter control signals to said processing blocks to switch the second parameters in said processing blocks.

7. The image processing apparatus as claimed in claim 6, wherein said decode means includes a plurality of decode units respectively provided for said plurality of processing blocks of said processing means.

8. The image processing apparatus as claimed in claim 6, further including timing adjusting means for adjusting timings of said area control signals with respect to said image signals.

9. The image processing apparatus according to claim 6, further including timing adjusting means for adjusting timings between said image signals and/or said area control signals with respect to said image signals.

10. The image processing apparatus as claimed in claim 6, wherein said processing means includes means for transforming said inputting image signals into image signals in a uniform color space, and area identifying means for identifying an image type for each image block based on the image signals in the uniform color space and generating an area identifying signal, and said decode means comprises means for generating the second parameter control signals in response to the area identifying signal and the area control signals.

* * * * *